March 26, 1935.  H. W. KAMACK  1,995,616
CONNECTION FOR JOINING SECTIONS OF RANGE BOILERS
AND PRESSURE VESSELS AND METHOD OF MAKING
Filed April 30, 1932

Inventor
Henry W. Kamack
By Wooster & Davis
Attorneys

Patented Mar. 26, 1935

1,995,616

UNITED STATES PATENT OFFICE 1,995,616

CONNECTION FOR JOINING SECTIONS OF RANGE BOILERS AND PRESSURE VESSELS AND METHOD OF MAKING

Henry W. Kamack, Waterbury, Conn., assignor to The American Brass Company, Waterbury, Conn., a corporation of Connecticut Application April 30, 1932, Serial No. 608,441

4 Claims. (Cl. 29—157.4)

This invention relates to new and useful improvements in connection for tubular sections, such for example as range boilers, and method of making same, and has for an object to provide an improved connection which does not involve riveting or otherwise perforating the tubular sections to connect them and which is therefore not likely to leak.

Another object is to provide a connection which is of neat appearance, strong and durable, and which is of simple and inexpensive construction.

A further object is to provide an improved method of connecting a pair of tubular sections whereby an improved joint is provided.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
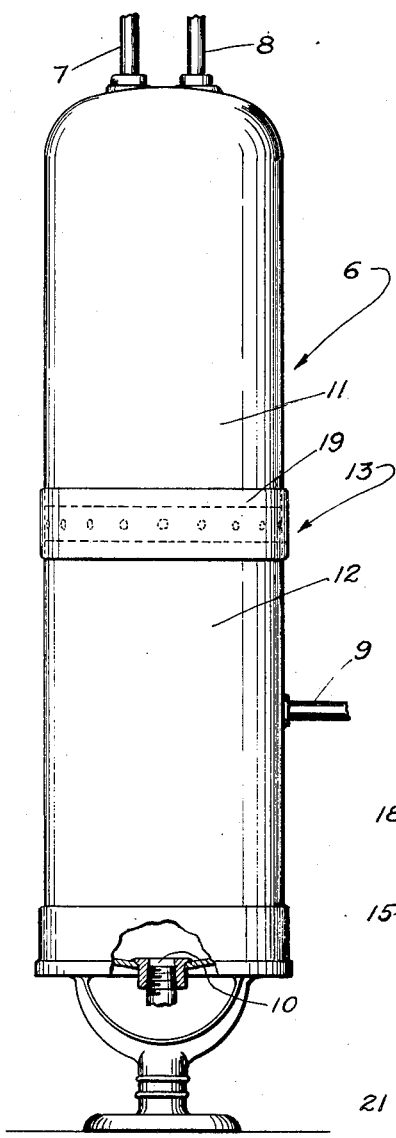
Fig. 1 is a front elevational view of a range boiler the sections of which are connected in accordance with the present invention.

In the accompanying drawing and in the following detailed description the invention is shown and described as forming a connection between the upper and lower sections of a range boiler. The present connection and the method of making it are useful in the making of range boilers, tanks and pressure vessels and in the joining of the ends of wrought metal pipe sections and the like. Therefore, I do not wish to be understood as limiting myself to any particular application of the invention.

Referring in detail to the drawing, at 6 is generally indicated a range boiler having inlet and outlet connections 7 and 8 for cold and hot water, a connection 9 to a heater, and a bottom or drain outlet 10. Boiler 6 includes upper and lower sections 11 and 12 connected or joined together in accordance with my invention, the connection between the sections being generally indicated by the reference character 13.

In forming my improved connection or joint one end portion of a tubular member is reduced, and the edge of the reduced end is turned in about on a 1/8" radius as indicated at 21 to permit easy entrance of reduced portion 14 into the upper end portion 15, and in a range boiler it is preferable that the lower end portion of the upper section be reduced and therefore in the accompanying drawing the lower end portion 14 of the section 11 of the range boiler is shown as of a reduced diameter. The diameter of the portion 14 is such that said portion has a forced fit in the upper end portion 15 of the section 12 of the boiler. That is, the external diameter of the portion 14 will be a few thousandths of an inch greater than the internal diameter of the section 12 whereby the sections will have a tight fit when forced together to partially telescope.

Inwardly directed hollow cups 16 are stamped or drawn in the end portion 14 adjacent the free end of the section 11 and these cups are spaced apart as shown and may be arranged in the form of a circle or they may be staggered with respect to one another. Additionally, it is not necessary that the cups be rounded as shown since they may be in the form of squares, oblongs and the like. These cups will be formed while the section 11 is separate from the section 12 and may therefore be formed by means of a suitable die, a suitable backing up means or anvil being inserted through the open end of the section.

The sections of a range boiler are frequently formed of copper although the material used is not a feature of the invention. Before the reduced end portion 14 is inserted into the end portion 11 the outer surface of end portion 14 and the inner surface of end portion 15 may be tinned. This tinning may take place either before or after the end portion is reduced and either before or after the cups 16 are formed. Cups 16 having been formed and the end portion 14 having been reduced the said end portion is forced into the end portion 15 by hydraulic or other pressure a very tight fit being desirable. Next, spaced portions of the material of the end portion 15 is forced into the cups 16 as shown at 17. A comparison of Figs. 2 and 3 will clearly illustrate this step and in Fig. 2 it will be noted that the material of end portion 15 has not been pressed into the cups 16 while in Fig. 3 such an operation has taken place.

These cups may also be formed in their entirety and in a single operation after sections 11 and 12 have been joined together by means of suitable anvil and supporting tools inserted through spud holes in ends of boilers.

It will be understood that the cups 16 are formed at spaced points entirely around the reduced portion of the section 11, and it will be apparent that when portions 17 of the section 12 have been pressed into these cups the sections will be mechanically connected. Heat is now applied to the overlapping or telescoping end portions of the sections whereby the tinned surfaces are sweated together. If necessary or desirable additional solder may be applied and solder 18 is applied at the upper edge of the section 12, and while this solder is being applied in the molten state some of it will run in between the telescoping portions of the sections filling the joint.

To complete the connection a ring or band 19 is now forced over the sections and into a position encircling the telescoping portions of the section and extending beyond such portions. This band 19 has a force fit with or over the tubular sections and the band may also be forced into position by suitable pressure means. If desired the inner surface of this band may be tinned prior to the assembly of the band on the sections and after the band is in position heat may be applied to sweat it to the sections at their overlapping end portions and to each side of said portions. That is, the band might be sweated to the end portion 15 of section 12 and to that section beyond that portion and to the section 11 inwardly of its reduced portion 14. Further, solder may be added during the sweating operation if desired, it being desirable that the entire joint between the band and the sections of the boiler be filled with solder as indicated at 20.

When the portions 17 are being forced into the cups 16 any suitable backing up tool may be used for supporting the cups. This tool would preferably be inserted into the boiler 6 through the drain opening 10 in the bottom thereof since such opening is usually of greater diameter than the other openings in the boiler. When a pair of open ended tubular sections are being connected, a backing up or supporting tool, may of course, be inserted through the outer end of either section.

It will now be understood that the sections 11 and 12 are tightly connected in a manner to prevent all leakage. The entire over-lapping surfaces of the sections are soldered together since in applying the solder 18 the joint will be filled. Additionally, the joint is reinforced by the band 19 and solder having been floated under this band and it being soldered at its edges and having a very tight fit a further means of preventing leakage is provided. Heretofore, it has been the custom to rivet together the overlapping portions of the sections and in use after expansion and contraction due to the heat of the contents of the boiler the rivets have worked loose in their holes resulting in leakage at the joint. Punching of the rivet holes also weakens the effective strength of the metal.

Figure 4:
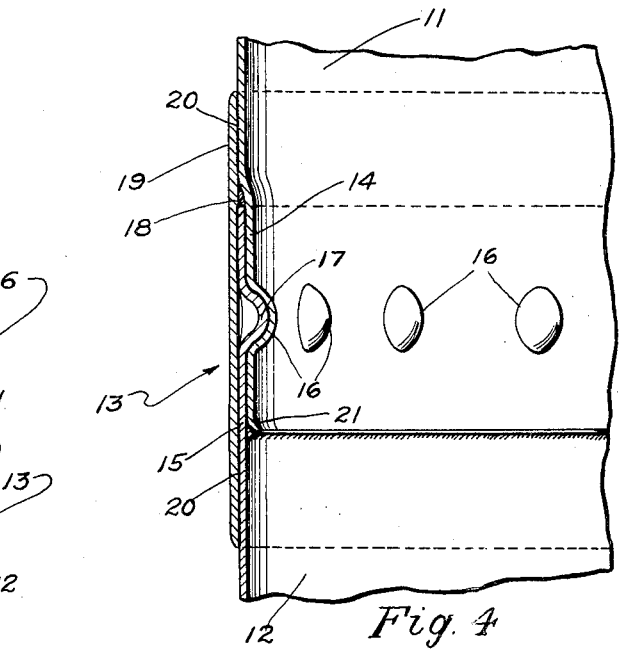
Fig. 4 is a view somewhat similar to Fig. 2 and showing the connection completed.
Figures 2, 3, 5:
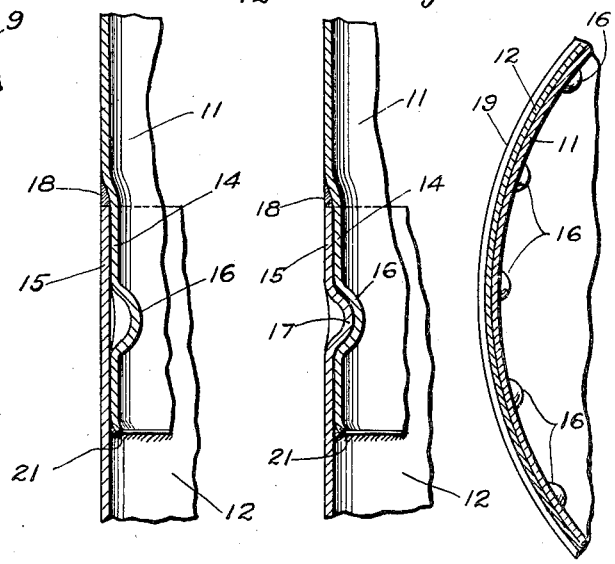
Fig. 2 is a detail sectional view on an enlarged scale and illustrating one step in the formation of my improved connection.
Fig. 3 is a view similar to Fig. 2 and showing a further step in the operation.
Fig. 5 is a top plan view of the parts shown in Fig. 4.

The present joint or connection and method of making the same does not require that any perforations be formed for rivets or the like and the opportunity for leakage is accordingly reduced. However, the interengaging cups 16 and 17 provide a strong mechanical joint or connection between the parts or sections. In fact the joint is much stronger than the riveted joint. Increase of internal pressure as exerted against the area surrounding the cups only tends to bind the interlocking cups tighter together. As above suggested it is preferable in the construction of a range boiler to reduce the lower end portion of the upper section so as to have the free edge of this portion disposed downwardly as shown in Figs. 2, 3 and 4 whereby said edge will not collect scale and the like.

Having thus set forth the nature of my invention, what I claim is:

1. A range boiler or similar pressure vessel comprising a pair of tubular wrought metal sections having open end portions telescoped one within the other and with the telescoped portion of the inner section larger than the outer section before telescoping to provide a forced fit, a series of spaced inwardly directed hollow cups formed in the walls of the inner telescoping end portion, similarly shaped hollow cups formed in the walls of the outer telescoping end portion providing inwardly directed projections closely fitting and seating in said first mentioned cups, solder sealing the forced fitting surfaces between the telescoping sections, a metal band embracing said telescoping portions and having a forced fit therewith, said band being of sufficient width to cover the cups in the outer section and the end edge of this section, and solder sealing the forced fit surfaces between the band and the sections.

2. The method of connecting the open end portions of two tubular wrought metal sections to form a range boiler or similar pressure vessel which comprises forming said sections with the open end portion of one sufficiently larger than the open end portion of the other to receive it in telescoping relation and with the inner diameter of the larger end portion slightly smaller than the outer diameter of the other end portion, forming a plurality of spaced inwardly directed cups in the walls of the smaller end portion spaced from the end thereof and tinning the inner surface of the larger end portion and the outer surface of the smaller end portion, forcing the two end portions into telescoping relation under pressure to provide a forced fit between them, forcing spaced portions of the wall of the outer section into said cups to form inwardly extending projections closely fitting the cups to take strains tending to separate the sections, heating the telescoping end portions to sweat them together, forcing a metal band over the joint of a size to provide a forced fit with the sections and of a width to cover the telescoping portions and the open sides of the cups in the outer section, and filling the joint between the band and sections with solder.

3. The method of connecting the open end portions of two tubular wrought metal sections to form a range boiler or similar pressure boiler which comprises forming said sections with the open end portion of one sufficiently larger than the open end portion of the other to receive it in telescoping relation and with the inner diameter of the larger end portion slightly smaller than the outer diameter of the other end portion, forming a plurality of spaced inwardly directed cups in the walls of the smaller end portion spaced from the end thereof, forcing the two end portions together in telescoping relation, forcing spaced portions of the wall of the outer section into said cups to form inwardly extending projections closely fitting the cups to take strains tending to separate the sections, soldering the overlapping surfaces of the two sections together, forcing a metal band over the sections to cover the joint and the open sides of the cups in the outer section, and soldering together the adjacent surfaces of the band and the sections.

4. A range boiler or similar pressure vessel comprising a pair of wrought metal sections having open ended portions telescoped one within the other with a tight fit, a series of spaced inwardly directed hollow cups formed in the walls of the inner telescoping end portion, similarly shaped hollow cups formed in the walls of the outer telescoping end portion providing inwardly directed projections closely fitting and seating in said first mentioned cups, solder sealing the tight fitting surfaces between the telescoping portions, a metal band embracing said telescoping portions and tightly fitting the same, said band being of sufficient width to cover the open sides of the cups in the outer section and the joint at the end edge of this section, and solder filling the joint between the band and the sections.

HENRY W. KAMACK.